United States Patent Office 2,925,844
Patented Feb. 23, 1960

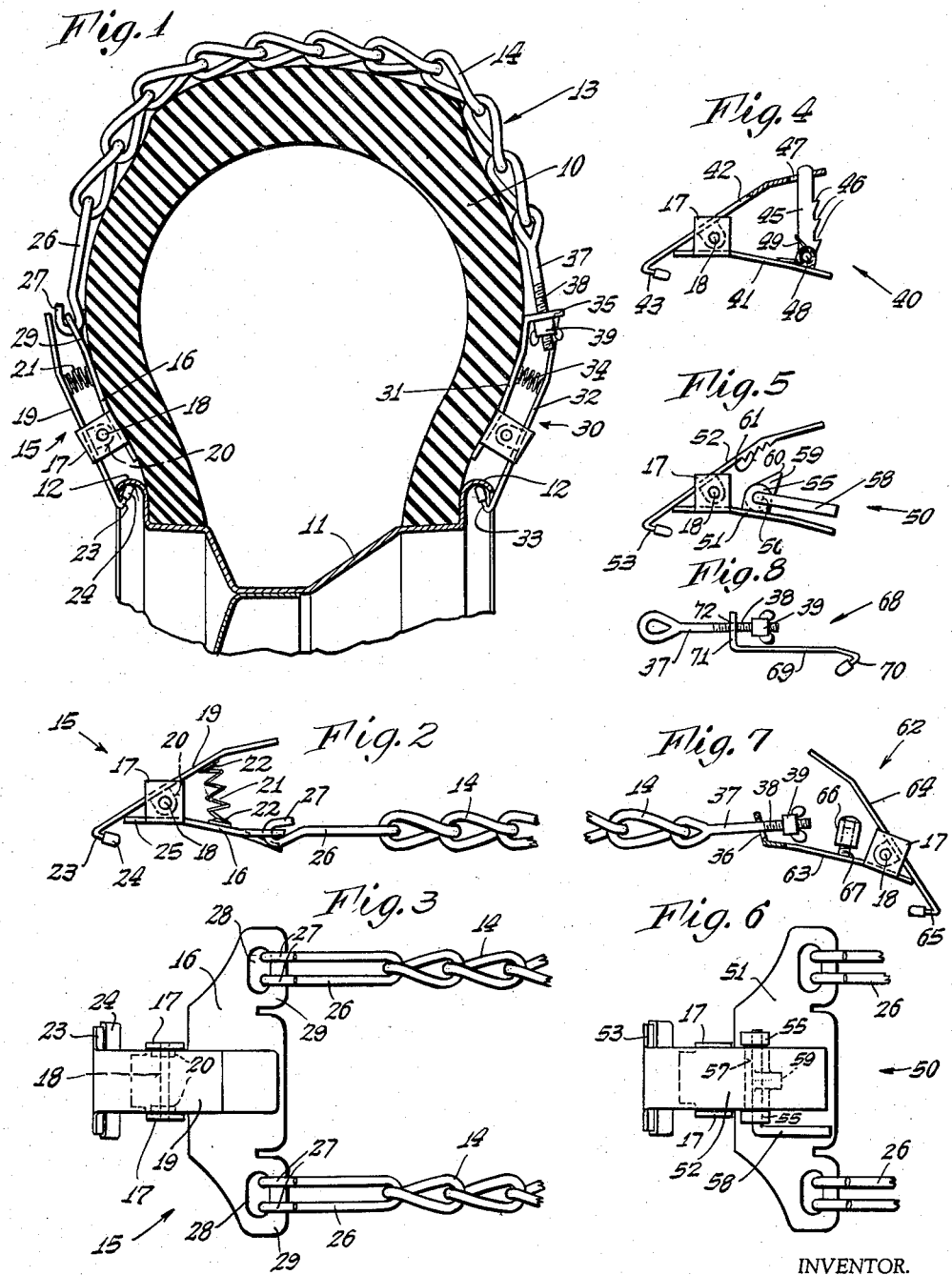

2,925,844

TRACTION CROSS-CHAIN FOR AUTOMOBILE TIRES

Charles E. Matthews, White Plains, N.Y.

Application May 21, 1958, Serial No. 736,909

9 Claims. (Cl. 152—236)

The present invention relates to a chain for increasing the traction of an automobile tire and more particularly to a chain which can be detachably secured to the rims of the tire wheel to extend across the periphery of the tire.

In view of the present state of snow and ice removal from roadways, the need of chains for increasing the traction of automobile tires has become substantially limited to short distances wherein there has been little removal of snow and ice as driveways, secondary streets or places where increased traction is especially needed, as on hills. Otherwise chains are not needed and, in fact, generally constitute a hindrance to operation of the automobile. Presently known and/or available tire chains have not been found satisfactory in fulfilling the present need for most automobiles and this appears traceable to two general defects. One is that the chains are so difficult to put on and take off the tire that once they are on, they are left on even when not needed and hence are unsatisfactory for only the short distances where they are needed. The other general defect is that presently known removable type cross-chains require a unique construction of tire wheel, for example having apertures formed therein or hooks secured thereon. Thus, though they may perform satisfactorily, their use is limited solely to this type of wheel and they do not have universal application on most automobiles.

It is an object of the present invention to provide a tire chain which may be easily and quickly secured to and detached from the wheel of an automobile tire.

A further object of the present invention is to provide a tire chain which can be secured to a type of tire wheel which is substantially universal on most present automobiles and which does not require a unique construction of wheel.

Another object of the present invention is to provide a chain of the above type which is economical to manufacture and which may be adjusted to compensate for various thicknesses of tire tread.

In carrying out the present invention there is provided at least one length of chain which extends across the tire and secured on either end of the chain are means for securing the chain to a tire wheel. Present day wheels are being manufactured out of metal and the outer ends of the wheel are reversely bent to form annular rims on opposite sides of the wheel. The present invention provides on each end of the chain a clamp having a hook which engages the rim to secure the chain thereto.

In each of the embodiments of the chain of the present invention there is provided at one end a releasing clamp which is formed of a base plate having pivoted thereon a lever which has one end projecting beyond the base plate and reversely bent to form a hook. The hook may be held against the rim by a spring as in one embodiment, a pivoted notched bar as in a second embodiment, or a pivoted cam in another embodiment. Each of these embodiments provides for the hook to be prevented from being released from the rim until the lever is manipulated, either by releasing the bar or cam or by a force opposing the spring. The other clamp of the chain may be identical to the spring urged releasing clamp above mentioned as in one form of the invention, it may be a similar clamp in which the spring is replaced by an adjustable member to limit the releasing movement of the lever or it may be just a substantially elongate flat piece of metal bent to form a hook. In each of the embodiments of the chain of the present invention, it will be understood that there is one of the first described releasing clamps attached to one end of the length of the chain and this releasing clamp is preferably secured to the outer rim of the wheel to facilitate attachment and removal of the chain. To compensate for varying thicknesses in tire tread and to some extent variations in dimensions between different sizes of tires, the chain includes at least one adjustment link for varying the length of the chain between the two clamps.

Other features and advantages will hereinafter appear.

In the drawing:

Figure 1 is a section of a portion of a tire and wheel showing the chain of the present invention attached thereto.

Fig. 2 is an elevation of the releasing clamp on the left-hand end of the chain of Fig. 1.

Fig. 3 is a plan view of the clamp of Fig. 2.

Fig. 4 is a side view, partially in section, showing a second embodiment of the releasing clamp.

Fig. 5 is a side view of a further embodiment of a releasing clamp.

Fig. 6 is a plan view of the clamp of Fig. 5.

Fig. 7 is a side view of a clamp for use with a releasing clamp.

Fig. 8 is another embodiment of a clamp for use with a releasing clamp.

Referring to the drawing, there is shown in Fig. 1 a tire generally indicated by the reference numeral 10 mounted on a wheel 11 which has on either side reversely bent end portions forming annular rims 12 on opposite sides of the tire. The chain of the present invention is generally indicated by the reference numeral 13 and consists of a length of chain 14, preferably two in number, and a clamp secured at each end of the chain. Each clamp hooks onto a rim and the length of chain 14 extends across the periphery of the tire to provide for increasing the traction of the tire.

A releasing clamp 15, as shown in Figs. 1, 2 and 3, consists of a base plate 16 which is somewhat curved to conform to the portion of the tire which it contacts and it has a pair of spaced, upstanding ears 17. A pin 18 extends between and is secured to the ears. A lever 19 is pivotally mounted on the base plate by having depending flanges 20 formed with apertures through which the pin 18 passes. A spring 21 extends between the lever 19 and the base plate 16 for biasing the lever counterclockwise, as shown in Fig. 2. To maintain the spring in place bosses 22 are formed on the lever and the base plate though, if desired, the spring could be secured by welding.

The lever 19 has an end portion extending beyond the base plate and this portion is reversely bent to form an angle of approximately 45° and serves as a hook 23 for engaging the rim. If desired, a protecting cover 24 of rubber or other resilient material may be secured on the hook 23 to prevent damage to the wheel rim. It will accordingly be appreciated that the spring 21 biases the hook 23 arcuately toward the base plate 16 and into engagement with a rim 12 while a clockwise movement of the hook serves to release the hook from the rim. A tongue 25 formed on the base plate limits the counterclockwise movement of the lever.

Each of the lengths of chain 14 have terminating members 26 which have reversely bent ends 27 that pass through apertures 28 formed in outer wings 29 of the base plate 16 to secure the lengths 14 to the clamp 15. These wings 29, as shown in Figs. 1 and 2, are substantially flat while the portion of the base plate therebetween is curved to space the wings above the tire and thereby minimize damage which the terminating members 26 may cause to the tire.

The other clamp 30 of the chain 13, shown in Fig. 1, is substantially identical to the clamp 15 above mentioned and hence has a base plate 31, a pivoted lever 32 formed with a hook 33 and a spring 34. However, in this embodiment of the invention, the base plate 31 is formed to provide upstanding wings 35 which extend outwardly from the base plate. Apertures 36 are formed therein and the other end member of each length consists of an eyelet 37 having a threaded shank 38 which passes through the aperture 36. A threaded nut which may be a wing nut 39 threads on the shank to secure the eyelet to the clamp 30. It will be appreciated that the upstanding wings enable the nut 39 to be rotated which in turn adjusts the distance between the clamps.

In order to provide a positive lock for the lever of the clamp 15 to prevent accidental releasement thereof, as for example, when the tire rubs against a curb by the curb pivoting the lever 19 the spring 21 is replaced by a positive locking mechanism for the lever 15. One such embodiment of a releasing clamp is shown in Fig. 4, while another embodiment is shown in Figs. 5 and 6. Shown in Fig. 4 is a releasing clamp 40 which is similar to the clamp 15 above mentioned and hence has a base plate 41 on which is pivoted a lever 42 formed with a hook 43. The locking mechanism for the lever 42 comprises an elongate bar 45 having notches 46 formed on one longitudinal surface. The bar extends through an elongate aperture 47 formed in the lever so that the notched surface engages one end of the aperture. The bar is pivotally mounted on a pivot pin 48 fastened on the base plate and a spring 49 urges the bar clockwise to cause engagement between the notches and the lever. It will be appreciated that the lever, once it is engaged in a notch, cannot be further moved clockwise. The lock is released by counterclockwise movement of the bar against the tension of the spring 49.

Shown in Figs. 5 and 6 is another embodiment of a clamp having a locking mechanism. The clamp 50 in these figures is similar to the clamp 15 above described and hence has a base plate 51 on which is pivoted a lever 52 having a hook 53. Formed on the base plate are two protuberances 55 each having an aperture 56 through which passes one leg 57 of an L-shaped link 58. Secured on the link between the bosses is a cam 59 having a rather sharp end 60 which is pivotally movable into engagement with transverse serrations 61 formed on the undersurface of the lever 52.

Accordingly rotational movement of the link 58 to pivot the cam 59 causes the end 60 to engage the serrations 61 when the tire chain is positioned on the tire and prevents releasing movement of the hook 53 away from the rim. Reverse rotational movement of the link 58 removes the cam from engagement with the serrations to enable removal of the hook from the rim.

The chain 13 of the present invention, however, only requires one of the above mentioned releasing clamps, namely 15, 40 or 50 to be secured on one end of the lengths of chain 14 in order to enable the attaching and releasing of the chain to the tire wheel. The other end of the chain (which is preferably positioned on the inside rim of the wheel) may have either one of the above mentioned releasing clamps but preferably is provided with the clamp 30 or one of the clamps hereinafter described without affecting the ease with which the chain may be attached or removed from the tire. Shown in Fig. 7 is a clamp 62 which has a base plate 63 and a lever 64 having a hook 65 pivoted thereon. In place of a spring or locking mechanism, however, there is provided an adjustable abutment on the base plate 63 to limit releasing movement of the lever. The abutment comprises a nut 66 threaded on an upstanding bolt 67 fastened on the base plate and it will be appreciated that the nut 66 can be adjustably set on the bolt 67 to limit the movement of the hook away from the base plate.

A further embodiment of a clamp 68 which may be used with one of the releasing clamps 15, 40 or 50 is shown in Fig. 8 and comprises a flat member 69 having one end reversely bent to form a hook 70 and its other end 71 upstanding. The other end 71 is provided with apertures 72 through which the threaded shanks 38 of the eyelets 37 pass and are secured thereon by the nuts 39. The hook 70 has preferably the same width as the hook 23 while the upstanding end 71 has the same width as the end of the base plate 16 to which the lengths 14 are secured in order to enable both lengths 14 to be secured thereto and maintain the lengths substantially parallel between clamps.

It will accordingly be appreciated that the tire chain of the present invention consists of a releasing clamp such as 15, 40 or 50 attached to one end of the lengths 14 and either a fixed clamp such as 62 or 68 or another releasing clamp such as 30 attached to the other end of the lengths 14. The releasing clamp may have a positive locking mechanism such as the clamps 40 and 50 or be spring urged as clamp 15. When the fixed clamps 62 or 68 are used, in order to facilitate securing and attaching the tire chain to the tire, the releasing clamp is preferably secured to the outside rim.

To position the chain on the tire wheel, the hook of the clamp for the inside rim is first engaged therewith, the lengths 14 drawn across the periphery of the tire and then the releasing clamp secured to the outside rim by pressing on the lever to move the hook end away from the base plate, then engaging the hook on the rim and releasing the lever as in clamp 15 or actuating the locking mechanism as in clamps 40 and 50. To detach the chain from the wheel, the lever of the releasing clamp is operated to release the hook from the outside rim and then the hook engaging the inside rim becomes released.

From the foregoing it will be appreciated that there has been disclosed a tire chain which may be easily attached to and detached from an automobile tire wheel. Since most, if not all automobiles being manufactured today, have wheels which have rims, the tire chain of the present invention has substantially universal application without requiring unique wheels. In addition the chain of the present invention provides for easily operated clamps for facilitating attaching and releasing the chain to the wheel. To accommodate variations in thicknesses of tire tread and small variations in tire sizes, the chain of the present invention provides for altering the length of the chain between the clamps.

Variations and modifications may be made within the scope of the claims and portions of the improvements may be used without others.

I claim:

1. A chain adapted to be secured to rims of an automobile tire and wheel comprising at least one length of chain adapted to extend across the tire periphery, means secured to one end of the length of chain for hooking said one end of the chain to the rim on one side of the tire and a releasing clamp secured to the other end of the length for hooking the said other end to the rim on the other side of the tire, said clamp comprising a base plate to which the end of the chain is secured, a lever pivotally mounted on one side of said plate and having one end projecting beyond the plate reversely bent to form a hook for releasable securement to the rim on the opposite side of the wheel, the length of the chain from hook to hook being such to cause engagement between the opposite side of the plate and a portion of the tire adjacent the rim, and means for maintaining the hook secured to the rim.

2. The invention as defined in claim 1 in which the maintaining means comprises a spring extending between the plate and the lever and biasing the hook toward the rim.

3. The invention as defined in claim 1 in which the maintaining means includes an elongate aperture formed in the lever, a bar pivotally mounted on the plate and extending through the aperture and having a notched longitudinal surface engageable with an end of the aperture, and spring means for biasing the notched surface into engagement with the end of the aperture.

4. The invention as defined in claim 1 in which the maintaining means includes a serrated portion formed on the undersurface of the lever, and a cam member pivotally mounted on the base plate and engageable with the serrated portion.

5. A chain adapted to be secured to the rims of an automobile tire and wheel comprising at least one length of chain adapted to extend across the tire periphery, means secured to one end of the length of chain for hooking said one end of the chain to the rim on one side of the tire, a clamp secured to the other end of the length for hooking the said other end to the rim on the other side of the tire, said clamp comprising a base plate to which the end of the chain is secured, a lever pivoted on said plate and having one end projecting beyond the plate reversely bent to form a hook, spring means on the plate engaging the lever for biasing the hook end toward the plate, the length of the chain from hook to hook being such to cause engagement between the opposite side of the plate and a portion of the tire adjacent the rim, and means forming part of the length of chain for adjusting the length of the chain.

6. The invention as defined in claim 5 in which the means includes an eyelet having a threaded shank, and a nut threadable on the shank.

7. A chain adapted to be secured to the rims of an automobile tire and wheel comprising at least one length of chain adapted to extend across the tire periphery, a clamp secured to each end of the length of chain for hooking each end to the rim on opposite sides of the tire, each clamp comprising a base plate to which the end of the chain is secured, a lever pivoted on said plate and having one end projecting beyond the plate reversely bent to form a hook, and spring means on the plate engaging the lever for biasing the hook end toward the plate, the length of the chain from hook to hook being such to cause engagement between the opposite side of each plate and portions of the tire adjacent the rim.

8. The invention as defined in claim 1 in which the means secured to the one end of the chain is a clamp having a base plate, a lever pivoted on said plate and having one end projecting beyond the plate reversely bent to form a hook, and an adjustable abutment mounted on the plate and engaging the lever for limiting the movement of the end away from the plate.

9. The invention as defined in claim 1 in which the means secured to the one end of the chain is an elongate, substantially flat member having one end reversely bent to form a hook.

References Cited in the file of this patent
UNITED STATES PATENTS

| | | |
|---|---|---|
| 109,563 | Walton | Nov. 22, 1870 |
| 536,701 | Peck | Apr. 2, 1895 |
| 1,536,362 | Traner et al. | May 5, 1925 |
| 2,448,730 | Paraskevas | Sept. 7, 1948 |
| 2,664,934 | Safran | Jan. 5, 1954 |
| 2,840,132 | Palmer et al. | June 24, 1958 |